United States Patent
Kawahara et al.

[11] Patent Number: 5,881,558
[45] Date of Patent: Mar. 16, 1999

[54] AIR CONDITIONING APPARATUS FOR VEHICLES

[75] Inventors: Tatsuhide Kawahara; Tomoki Izawa, both of Nishi-Kasugai-gun, Japan

[73] Assignee: Mitsubishi Heavy Industries, Ltd., Tokyo, Japan

[21] Appl. No.: 826,503

[22] Filed: Apr. 3, 1997

[30] Foreign Application Priority Data

Apr. 3, 1996 [JP] Japan .................................. 8-081545
Apr. 24, 1996 [JP] Japan .................................. 8-102512

[51] Int. Cl.$^6$ ...................................................... B60H 1/00
[52] U.S. Cl. .............................................. 62/408; 454/156
[58] Field of Search ............................. 62/404, 407, 408, 62/419, 426, 339, 241

[56] References Cited

U.S. PATENT DOCUMENTS

| | | | |
|---|---|---|---|
| 4,476,773 | 10/1984 | Fehr ......................................... | 454/156 |
| 4,852,639 | 8/1989 | Horiguchi et al. ......................... | 165/42 |
| 5,025,711 | 6/1991 | Cassidy .................................... | 454/156 |
| 5,154,223 | 10/1992 | Ishimaru et al. ......................... | 454/160 |
| 5,162,020 | 11/1992 | Asano et al. ............................. | 454/156 |
| 5,326,315 | 7/1994 | Inoue et al. ............................. | 454/126 |
| 5,653,630 | 8/1997 | Higashihara ............................. | 454/121 |

FOREIGN PATENT DOCUMENTS 3-1812 1/1991 Japan .

*Primary Examiner*—William Doerrler
*Attorney, Agent, or Firm*—Wenderoth, Lind & Ponack, L.L.P.

[57] ABSTRACT

In an air conditioning apparatus for a vehicle having a casing which has an air suction opening and an air blowing opening at opposite ends of the casing. Contained within the casing are a fan for feeding air, an evaporator, an air mixing damper, and a heater, disposed in order from an upstream end of the casing. The air mixing damper is disposed in a position closely adjacent to an upstream side of the heater. The damper is constructed so as to be movable between a position for fully closing a front side of the heater and another position for fully closing a by-pass air flow passage provided for by-passing the heater. Provided at one side of the damper, is a rack extending along a moving direction of the damper, and a driving shaft, which is rotatably supported in the casing and carries a pinion which is engaged with the rack.

7 Claims, 11 Drawing Sheets

AIR CONDITIONING APPARATUS FOR VEHICLES

BACKGROUND OF THE INVENTION

1. Field of the Invention

The present invention generally relates to an air conditioning apparatus for cooling and heating vehicles, such as automobiles.

2. Description of Relevant Art

FIG. 15 is an arrangement view showing a conventional example of air conditioning apparatus for cooling and heating vehicles. In FIG. 15, a casing 1 which in order from an upstream end contains therein air conditioning components such as a fan 2 for feeding air, an evaporator 3, an air mixing damper 5, and a heater 4.

At one end of the casing 1 are provided an inside air suction opening 21 and an outside air suction opening 22 are provided. The openings 21,22 are selectively opened by a switching damper 9 for selectively introducing the air circulating within the compartment and air from the outside. Disposed downstream of the suction openings 21, 22 is the fan 2 directly connected to an electric motor. Disposed within a pressurized air passage 24 downstream of the fan 2 is the evaporator 3 which has a refrigerant or coolant inlet connected to an expansion valve (not shown) via a refrigerant tube and a refrigerant outlet connected to a compressor (not shown) via another refrigerant tube. The heater 4 is disposed within a pressurized air passage 25 downstream of the evaporator 3. The hot water inlet and outlet of the heater 4 are connected via hot water tubes to a cooling water circuit system (not shown) for a vehicular engine.

Disposed within the air passage 25 just upstream of the heater 4 is the air mixing damper 5 which is fixed to a damper driving shaft 10 to be swung therewith. The damper 5 is swingable about the shaft 10 within the air passage 25 upstream of the heater 4, so as to be operable between positions to fully close and fully open the front air receiving side of the heater 4. Thus, there is ensured a space within the air passage 25, for operating the damper 5.

In the operation of the air conditioning apparatus as constructed above, the fan 2 is driven to selectively introduce the air circulating within the compartment through the inside air suction opening 21 or the outside air through the outside air suction opening 22, so as to pressurizingly feed the introduced air to the air passage 24. The pressurized fed air passes through the gaps between the fins of evaporator 3, where it is cooled by heat exchange with the refrigerant flowing in the tubes of the fins, and thereafter reaches the air passage 25. If the air mixing damper 5 is then positioned to fully close the front side of heater 4, the air cooled by the evaporator 3, passes through the passage 25, a pressurized air passage 23 downstream of the heater 4, and a damper (not shown) for switching the modes of blow openings, and is blown as cooled air into the compartment via the blow openings, while by-passing the heater 4.

When the air mixing damper 5 is rotated into the position depicted by a broken line in FIG. 15 to fully open the front side of the heater 4, the air passage 25 is fully closed except for the heater 4, so that the air cooled by evaporator 3 is introduced into the heater 4. The thus introduced air is heated by heat exchange with the hot water flowing in the tube of heater 4, passes through the air passage 23 downstream of heater 4, and through the aforementioned mode switching damper, and is finally blown as hot air into the compartment via the blow openings.

When the air mixing damper 5 is kept in the position between the full opening and closing positions for the front side of heater 4, the air cooled by evaporator 3 partially passes through the heater 4 to be heated into hot air, and the remainder unchangedly by-passes the heater 4. The cooled air and hot air are then mixed with each other within the outlet air passage 23 downstream of heater 4, and the thus mixed air is blown into the compartment via the blow openings in the same manner as above, at an adjusted temperature determined by the mixing ratio. That is, within such a range that the air mixing damper 5 is rotated from the full closing position to the full opening position for the heater 4, the flowing directions of air upstream of heater 4 can be adjusted by the operational angular position of damper 5 to change the mixing ratio of the hot air to the cooled air such that the temperature of mixed air blown into the compartment is adjusted.

However, there exist such problems to be solved in the conventional air conditioning apparatus for vehicles (automobiles) shown in FIG. 15.

Namely, in such a conventional air conditioning apparatus for vehicles, the temperature of air blown into the compartment is adjusted by the angular position of the air mixing damper 5 which is directly connected to the damper driving shaft 10 supported by the casing 1 and swung about the shaft 10 as the rotation axis. This means that a space should be ensured within the casing 1, for accommodating the angular motion of the air mixing damper 5. The provision of such a space for accommodating the swing of damper 5 represents a large restriction in reducing the size of casing 1.

Further, the temperature of air blown into the compartment could not be fully proportioned to the operational angle of damper 5, since the adjustment of mixing ratio of the hot air to the cooled air for adjusting the air temperature at the blow openings is performed by adjusting the air flowing directions within the air passage by changing the swung angle of the air mixing damper 5. Thus, it is also difficult to adjust the temperature of blown air, in the conventional technique. In addition, since the air mixing damper 5 is operated to swing within the pressurized air passage 25, the damper 5 undergoes a dynamic pressure of the passing air, resulting in large fluctuations of the required operational forces for damper 5 depending on its operational angles. Thus, it is difficult to set or determine the operational forces of the damper 5.

Still further, since the driving device for driving the air mixing damper 5 is typically projected outwardly from the casing 1, the space required for installing and operating the driving device is increased in size, thereby preventing a reduction in size and compactness which is most required for vehicles.

SUMMARY OF THE INVENTION

It is accordingly a first object of the present invention to provide an air conditioning apparatus for vehicles in which the space required for installing and operating the air mixing damper is reduced in size to compact the apparatus, and the fluctuations of operating forces of the air mixing damper are reduced to facilitate the setting of such forces.

It is a second object to provide a small-sized and compact air mixing damper by reducing the space for installing and operating the mechanism for driving the air mixing damper.

The present invention has been proposed to achieve the above objects, and has as a first aspect thereof an air conditioning apparatus for a vehicle having a casing (1) which has an air suction opening and an air blowing opening at one and the other ends thereof, respectively, and contains therein a fan (2) for feeding air, an evaporator (3), an air mixing damper (5), and a heater (4), in order from the upstream end of the casing with respect to the air flow.

The air mixing damper (5) is disposed in a position upstream of the heater (4) adjacent thereto, and comprises a platelike damper movable in a direction perpendicular to the air flow direction.

Also, the platelike air mixing damper (5) is constituted to be movable between a position for fully closing a front side of the heater (4) and another position for fully closing a by-pass air flow passage provided for by-passing the heater (4).

The present invention has second, third and fourth aspects thereof related to a concrete structure of the air mixing damper (5). The second aspect is that the air mixing damper (5) comprises a damper guide (6) having a guide groove (7), and a damping member (51) comprising a plate member slidably fitted into the guide groove (7).

The third aspect is that the damper guide (6) comprises paired halves which are joined to each other to cooperatively form a rectangular frame having the guide groove (7) formed along the inner periphery thereof, and the rectangular frame is disposed within the casing (1).

The fourth aspect is that the air mixing damper (5) has a passage area such as to fully open the by-pass air flow passage when the damper (5) is in a position to fully close the front side of the heater (4) and to fully open the front side of the heater (4) when the damper (5) is in a position to fully close the by-pass air flow passage, so that the flow rates of air through the by-pass air flow passage and the heater (4) are distributed in a proportion in accordance with the position of the damper (5) between the full open and full close positions.

According to the first through fourth aspects, when the air mixing damper (5), which is disposed substantially perpendicularly to the air flow for the pressurized air passage (25) just upstream of the heater (4), is in a position to close the front side of the heater (4), the air cooled by the evaporator (3) is blown into the compartment as cooled air via blow openings after by-passing the heater (4) and passing through the air passage (23) downstream of heater (4).

Further, when the air mixing damper (5) has been moved along the damper guide (6) in a direction perpendicular to the air flow into such a position to fully open the front side of heater (4), the half of air passage (25) is closed by the damper (5) so that the whole of cooled air from the evaporator (3) passes through to be heated by the heater (4) and thereafter is blown as hot air into the compartment via blow openings. In addition, when the damper (5) is shifted into the intermediate position, a part of the cooled air from evaporator (3) passes through to be heated by the heater (4) while the remainder by-passes the heater (4) so that they are mixed with each other within the air passage (23) downstream of heater (4) and thereafter finally blown into the compartment via blow openings at an air temperature determined by the mixing ratio.

According to these aspects, the air mixing damper (5) is formed in a platelike configuration and moved within a range in the direction perpendicular to the air flow, so that the installation space required for operating the air mixing damper (5) is remarkably reduced as compared to the conventional technique, as understood from the above.

Further, since the air mixing damper (5) is disposed in the direction substantially perpendicular to the air flow and operated in this direction, the damper (5) is operated while perpendicularly receiving a dynamic pressure of air flow so that the operating forces for the air mixing damper (5) are uniform over the entire operational range with reduced fluctuations.

Yet further, since the heat exchanging area is increased and decreased as the air mixing damper (5) is moved in the direction perpendicular to the air flow, the blown air temperature to be determined by the mixing ratio of the heated air to the cooled air becomes proportional to the operational quantity (displacement quantity) of the damper. Thus, the adjustment of blown air temperature is facilitated.

Still further, according to the third aspect, the assembly and disassembly of the damper guide (6) and damping member (51) are facilitated, and the numbers of assembling and maintenance processes therefor are reduced.

The present invention further provides the fifth through seventh aspects as driving mechanism for driving the air mixing damper (5).

Namely, the present invention has as the fifth aspect thereof an air conditioning apparatus for a vehicle having the same arrangement of components with the first through fourth aspects, wherein the air mixing damper (5) is disposed in a position upstream of the heater (4) adjacent thereto, and comprises a platelike damper movable in a direction perpendicular to the air flow direction, the platelike air mixing damper (5) is constituted to be movable between a position for fully closing a front side of the heater (4) and another position for fully closing a by-pass air flow passage provided for by-passing the heater (4), and the apparatus further comprises a rack (11) positioned along a moving direction of the damper (5) at one side thereof, a pinion (10) engaged with the rack (11), and a driving shaft (9) rotatably supported in the casing (1a, 1b) to carry the pinion (10).

Preferably, the rack (11) and the driving shaft (9) carrying the pinion (10) are disposed in positions upstream of the air mixing damper (5).

According to the fifth aspect, when the air mixing damper (5), which is disposed in a direction substantially perpendicular to the air flow in the air passage (25) just upstream of the heater (4), is in a position to fully close the front side of the heater (4), the air cooled by the evaporator (3) passes the air passage downstream of the heater (4), while by-passing the heater (4), and is thereafter blown as cooled air into the compartment via blow openings. Further, as the rack (11) fixed to the air mixing damper (5) is moved via pinion (10) fixed to the driving shaft (9) by rotating it, the air mixing damper (5) is moved along the damper guide (6a, 6b) in a direction perpendicular to the air flow to thereby fully open the front side of the heater (4). Thus, the half of the air passage (25) is closed by the air mixing damper (5), so that the whole of air cooled by the evaporator (3) passes through to be heated by the heater (4) and thereafter is blown as hot air into the compartment via the blow openings. In addition, when the damper (5) is shifted into an intermediate position, a part of the cooled air passes through to be heated by the heater (4) while the remainder by-passes the heater (4) so that they are mixed with each other within the air passage (23) downstream of the heater (4) and thereafter finally blown into the compartment via blow openings at an air temperature determined by the mixing ratio.

Thus, according to the fifth aspect, the air mixing damper (5) is formed into a platelike configuration and moved within a range in the direction perpendicular to the air flow, so that the installation space required for operating the air mixing damper (5) is remarkably decreased as compared to the conventional technique, as understood from the above.

Further, since the air mixing damper (5) is disposed in the direction substantially perpendicular to the air flow and operated in this direction, it is operated while perpendicularly receiving a dynamic pressure of air flow so that the operating forces for the air mixing damper (5) are uniform over the entire operational range with reduced fluctuations.

Yet further, since the heat exchanging area is increased and decreased as the air mixing damper (5) is moved in the direction perpendicular to the air flow, the blown air temperature to be determined by the mixing ratio of the heated air to the cooled air becomes proportional to the operational quantity of the air mixing damper (5). Thus, the adjustment of blown air temperature is facilitated.

Still further, there are housed within the casing (1a, 1b) the driving mechanism for driving the air mixing damper (5), comprising a driving shaft (9), a pinion (10) attached to the shaft(9), and a rack (11) attached to the air mixing damper (5), so that the driving mechanism is not exposed to the outside of the casing (1a,1b) and the overall apparatus becomes smaller and more compact thus reducing the space required for installing and operating the apparatus.

The sixth aspect of the present invention is that the fifth aspect further comprises a damper guide (6) disposed within the casing (1a, 1b), the guide (6) having a guide groove (7) for slidably guiding the platelike damping member (51), and bearings (8a, 8b) for rotatably supporting the driving shaft (9), such that the damping member (51) and driving shaft (9) are disposed within the casing (1a, 1b) through the damper guide (6), and the damper guide (6) is formed into a rectangular frame by two frame pieces which are separable in a direction perpendicular to an axis of the driving shaft (9).

According to the sixth aspect, with respect to the damper guide (6a, 6b) having the separable structure independently from the casing (1a, 1b), it becomes possible to produce both bearings (8a, 8b) based on the guide groove (7) for slidably guiding the air mixing damper (5), and the air mixing damper (5) and the driving shaft (9) for driving the pinion (10) can be previously and independently assembled to the damper guide (6) whereafter this assembly can be assembled to the casing (1a, 1b). Thus, the assembly of casing (1a, 1b) can be remarkably facilitated.

Preferably, the frame halves for forming the rectangular frame are made of resin material shaped bodies so as to be integrally provided with the guide groove (7) and the bearing portions (8a, 8b).

The seventh aspect of the present invention is that the fifth aspect further comprises a guide groove (7) for slidably guiding a damping member (51) of the air mixing damper (5), and bearing portions (8a, 8b) for rotatably supporting the driving shaft (9).

The guide groove (7) and the bearing portions (8a, 8b) are integrally formed with the casing (1a, 1b) which is formed into a structure separable into two pieces (1a and 1b).

According to the seventh aspect, there are housed within the casing (1a, 1b) the driving components such as a driving shaft (9), a pinion (10), and a rack (11), so that a small-sized and compact structure can be obtained, while the casing (1a, 1b) and damper guide (6) are integrated with each other, so that the construction of this aspect is more simplified than the first through sixth aspects while reducing the number of constituent parts.

The present invention is constituted in such a manner as described above, so that the effects achieved thereby can be summarized as follows.

1. The air mixing damper (5) is formed in a platelike configuration and moves within a range in the direction perpendicular to the air flow, so that the space required for installing and operating the air mixing damper (5) is remarkably reduced as compared to the conventional technique. Thus the casing (1) is reduced in size to provide an air conditioning apparatus which is small-sized and compact.

Further, since the air mixing damper (5) is operated while normally and perpendicularly receiving a dynamic pressure of air flow, the fluctuations of operating forces for the air mixing damper (5) are reduced over the entire operational range. Thus, the setting of the operational forces can be facilitated. In addition, since the heat exchanging area of the heater (4) is increased and decreased as the air mixing damper (5) is moved, the blown air temperature to be determined by the mixing ratio of the heated air to the cooled air becomes proportional to the operational quantity of the air mixing damper (5), so that the adjustment of blown air temperature is facilitated.

2. The driving mechanism for the air mixing damper (5) is structurally housed within the casing (1a, 1b), so that the driving mechanism is not exposed to the outside and the space for installing and operating the same is reduced so as to provide a small-sized and compact air conditioning apparatus which is eagerly desired for vehicles.

Particularly, as the damper guide (6) can be constituted independently of the casing (1a, 1b), the guide (6) can be produced integrally with the bearings (8a, 8b) based on the guide groove (7) for fitting the air mixing damper (5) thereunto, so that the machining precision therefor is remarkably improved. In addition, it becomes possible to independently or partially assemble the damper guide (6) and the driving shaft (9) integrated with the pinion (10) for driving the damping member (51) and the air mixing damper (5), so that the control of gaps between the damping member (51) and guide groove (7) and the adjustment of engagement between the pinion (10) and rack (11) are facilitated. Further, the assembly of the casing (1a, 1b) is facilitated, since the independently obtained assembly can be assembled to the casing (1a, 1b) after the former has been completed.

In case that the damper guide (6) is integrated with the casing (1a, 1b), the number of constituent parts and the manufacturing cost are more drastically reduced while simplifying the structure.

DETAILED DESCRIPTION OF THE PREFERRED EMBODIMENTS

Figure 1:
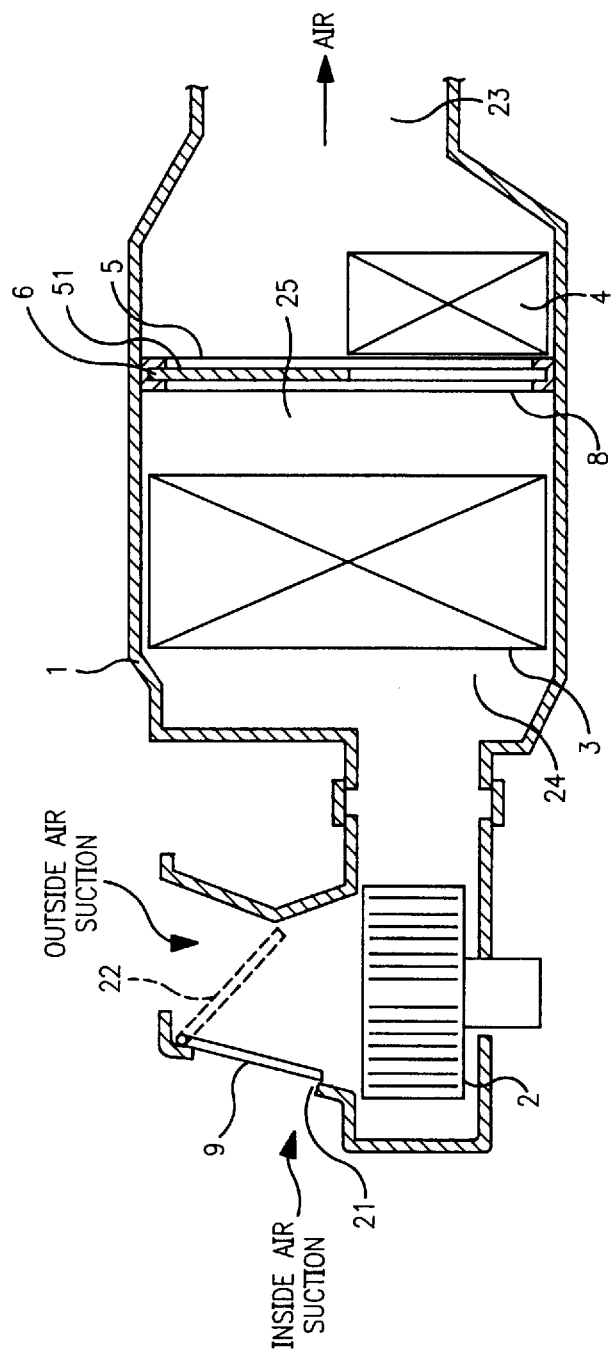
FIG. 1 is a longitudinal sectional view of an air conditioning apparatus for vehicles according to a first embodiment of the present invention, for showing the maximum heating state.
Figure 2:
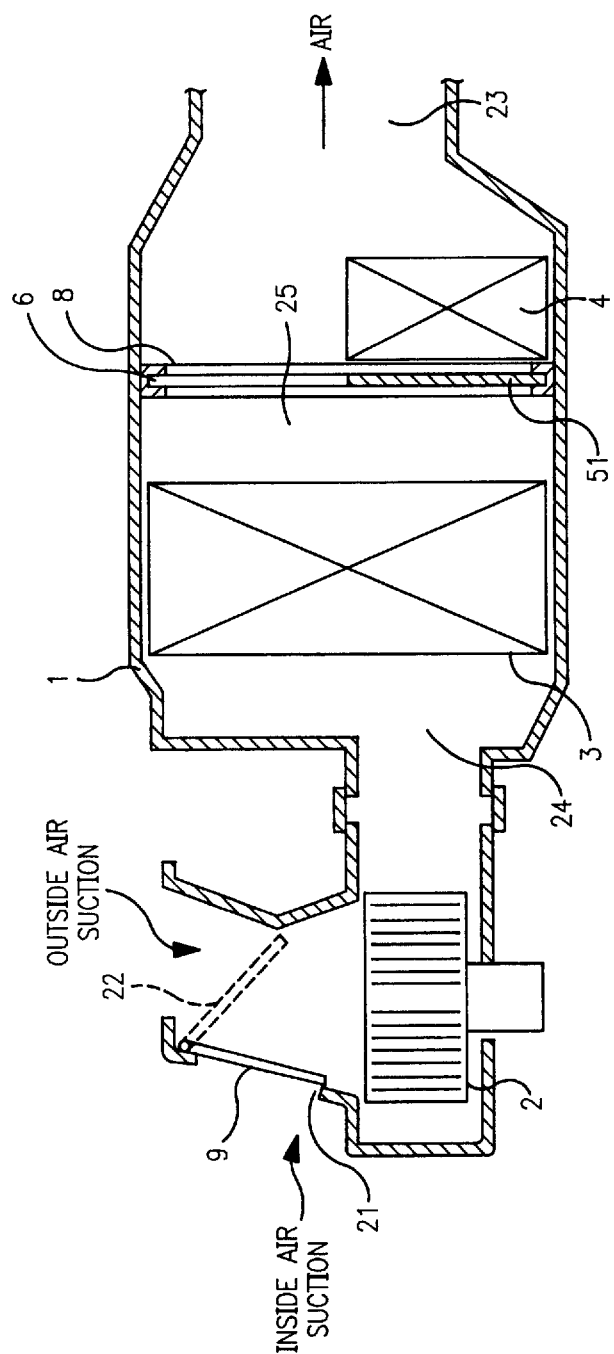
FIG. 2 is a view corresponding to FIG. 1 of the first embodiment for showing the maximum cooling state.
Figure 3:
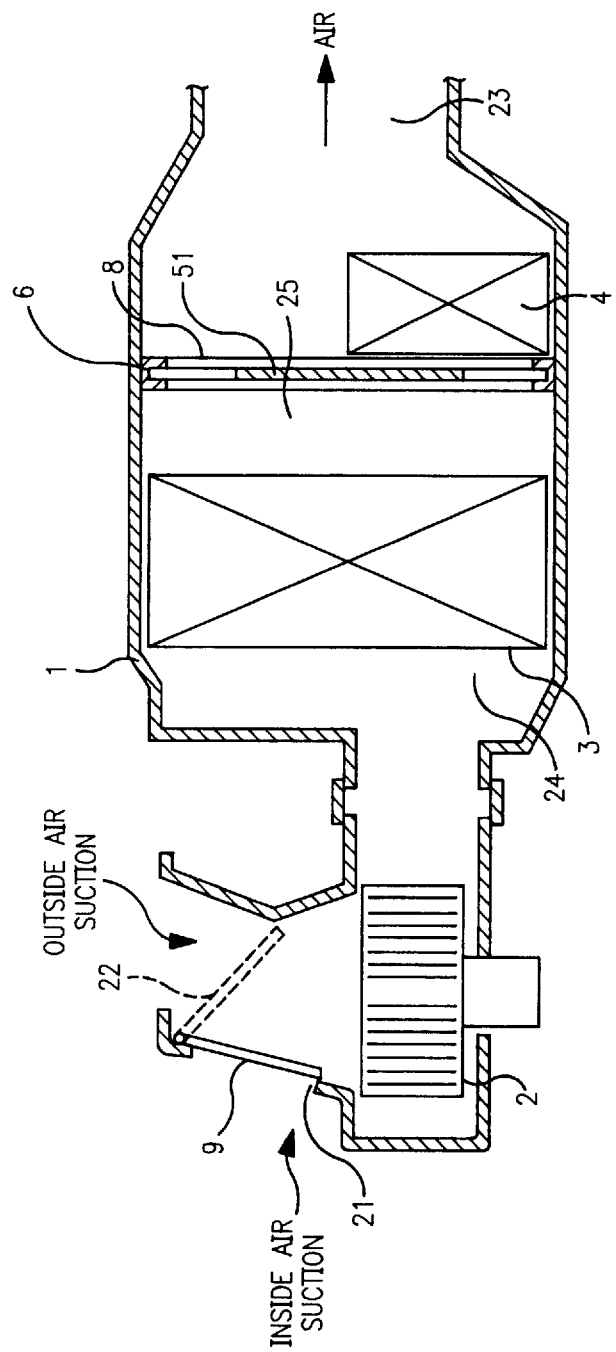
FIG. 3 is a view corresponding to FIG. 1 of the first embodiment for showing the intermediate state.

In FIGS. 1 through 3 showing the first embodiment of the present invention, a casing 1 which contains therein air conditioning components such as a fan 2 for feeding air, an evaporator 3, an air mixing damper 5, and a heater 4, in order from the upstream of air flow. The order of these components is the same as in the conventional described above.

At one end of the casing 1 are provided an inside air suction opening 21 and an outside air suction opening 22, which are selectively opened by a switching damper 9 for selectively introducing the air circulating within the compartment and that from the outside. Disposed downstream of the suction openings 21, 22 is the fan 2 which is directly connected to an electric motor.

Disposed within a pressurized air passage 24 downstream of the fan 2 is the evaporator 3 which has a refrigerant or coolant inlet connected to an expansion valve (not shown) via a refrigerant tube and a refrigerant outlet connected to a compressor (not shown) via another refrigerant tube. The heater 4 is disposed within a pressurized air passage 25 downstream of the evaporator 3. The hot water inlet and outlet of the heater 4 are connected via hot water tubes to a cooling water circuit system (not shown) for a vehicular engine.

Figure 15:
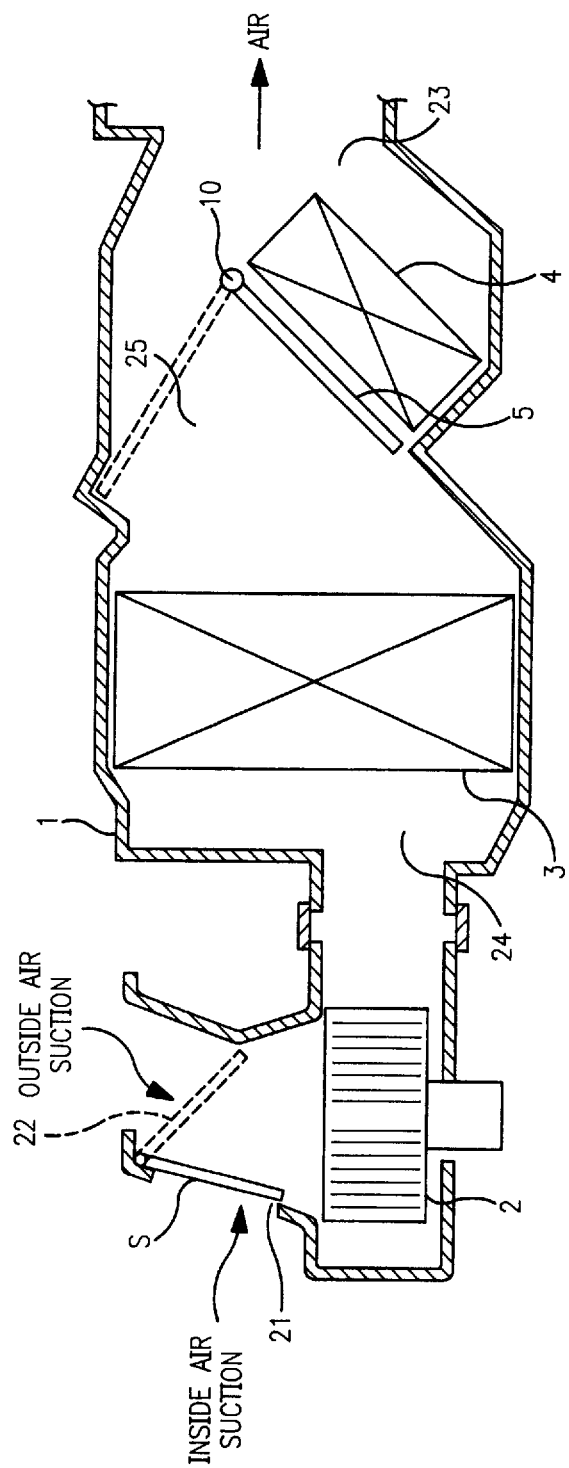
FIG. 15 is a longitudinal sectional view for showing a conventional air conditioning apparatus.

The above construction of the present invention is same as with those of the conventional apparatus shown in FIG. 15.

The present invention relates to an improvement in mounting structure of the air mixing damper 5.

Figure 4:
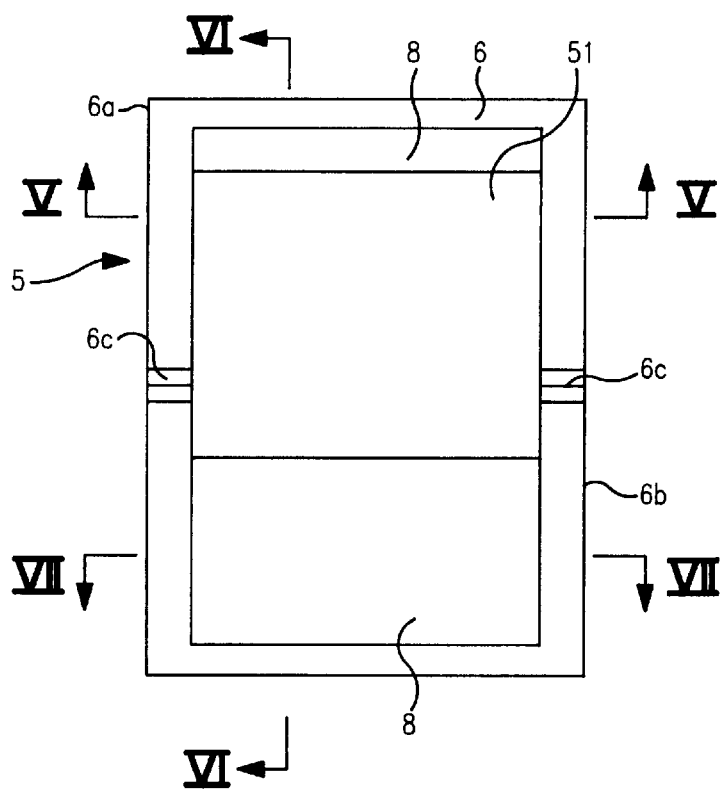
FIG. 4 is a front view of an air mixing damper of the first embodiment.
Figure 5:
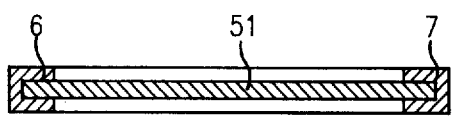
FIG. 5 is a sectional view taken along line V—V of FIG. 4.
Figure 6:
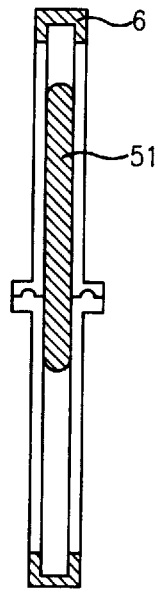
FIG. 6 is a sectional view taken along line VI—VI of FIG. 4.
Figure 7:
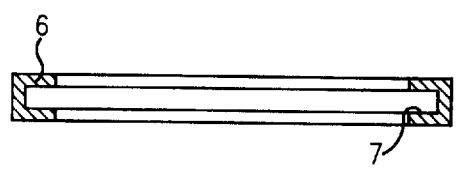
FIG. 7 is a sectional view taken along line VII—VII of FIG. 4.

In FIGS. 1 through 3, the air mixing damper 5 has a platelike configuration, and is disposed in a position just upstream of the heater 4 and closely adjacent thereto. Designated at 51 is a platelike damping member, and 6 denotes a damper guide which is separable into upper and lower parts (see FIG. 4).

Namely, as shown in FIGS. 4 through 7, the damper guide 6 comprises a paired upper and lower halves 6a and 6b which are joined to each other at their joining surfaces 6c to cooperatively form a rectangular frame having a guide groove 7 formed along an inner periphery thereof and define an air through opening 8. Slidably fitted into the guide groove 7 of the damper guide 6 is the platelike damping member 51 which is movable in the direction of its plate surface, i.e., in the direction perpendicular to the air flow through the pressurized air passage 25. The damping member 51 is driven by driving means (such as that in the second embodiment to be described later) and is movable in the direction substantially parallel to a front air receiving side of the heater 4, i.e., in the direction perpendicular to the air flow, and the driving range therefor is from the position for fully closing such side of heater 4 up to that for fully opening it. The opening degree of the air mixing damper 5 is determined such that, the half of the air through opening 8 is fully opened so that the pressurized air passage 25 is also fully opened when the damping member 51 is in the position (FIG. 2) for fully closing the front side of heater 4, and the mentioned half of the opening 8 is fully closed so that the passage 25 is also fully closed to direct all of the air through the heater 4 when the damping member 51 is in the position (FIG. 1) for fully opening the front side of heater 4.

During the operation of the air conditioning apparatus for vehicles as constituted above, the fan 2 is driven to introduce the inside air circulating within the compartment or that from the outside from the suction port 21 or 22, and pressurizingly feed it into the air passage 24. The pressurized (inside or outside) air passes through the gaps between the fins of evaporator 3, where it is cooled by heat exchange with the refrigerant flowing in the tubes of the fins, and thereafter reaches the air passage 25 upstream of heater 4.

As shown in FIG. 1, when the damping member 51 of air mixing damper 5 is in the position to fully open the front side of heater 4, the damping member 51 fully closes the half of opening 8. Thus, the whole air cooled by the evaporator 3 is directed into the heater 4 to pass through the gaps between the fins of heater 4, where it is heated by the heat exchange with the hot water flowing in the tubes of the fins, and through a blowing mode switching damper (not shown) disposed within a pressurized air passage 23 downstream of heater 4, and is finally blown as hot air into the compartment via blow openings (not shown). This is the maximum heating state.

As shown in FIG. 2, when the damping member 51 is shifted into the position to fully close the front side of heater 4, the whole air cooled by the evaporator 3 is fed through the opening 8 into the downstream passage 23 while by-passing the heater 4, and thereafter through the mode switching damper so as to be finally blown as cooled air into the compartment via the blow openings. This is the maximum cooling state.

Further, as shown in FIG. 3, when the damping member 51 is shifted into an intermediate position, the cooled air from evaporator 3 is divided into streams such as a cooled air stream passing through the opening 8 while by-passing the heater 4 and a stream passing through the opening 8 into the heater 4 so as to be heated there, which are thereafter mixed with each other within the outlet air passage 23. The thus mixed air, having a temperature determined by the mixing ratio of the hot air to the cooled air, is blown into the compartment via the blow openings. This is an intermediate condition.

During the operation of air mixing damper 5 described above, the plate surface of its damping member 51 is operated while normally receiving a dynamic air pressure perpendicularly and uniformly thereto, so that the fluctuations of operating forces of the damper 5 are reduced over the entire operation range to thereby facilitate the setting of such forces.

Further, the area of front side, i.e., heat exchanging area of heater 4 is increased or decreased as the damping member 51 is moved in the direction perpendicular to the air flow, so that the blown air temperature to be determined by the mixing ratio of the heated air to the cooled air becomes proportional to the operational quantity of the air mixing damper 5. Thus, the adjustment of blown air temperature is facilitated.

In FIGS. 8 through 12, showing a second embodiment of the present invention, reference numerals 1a and 1b designate the right and left casing halves which are joined to each other at the joining surfaces "01" to cooperatively constitute a casing 1a, 1b which contains therein the air conditioning components such as fan 2 for feeding air, evaporator 3, air mixing damper 5, and heater 4, in order from the upstream of air flow. The casing 1a, 1b has a structure which is separable into right and left halves. The arrangement order of these components is same as in the conventional apparatus described above.

At one end of the casing 1a, 1b are provided an inside air suction opening 21 and an outside air suction opening 22, which are selectively opened by a switching damper S for selectively introducing the air circulating within the compartment and that from the outside. Disposed downstream of the suction openings 21, 22 is the fan 2 which is directly connected to an electric motor.

Disposed within a pressurized air passage 24 downstream of the fan 2 is the evaporator 3 which has a refrigerant or coolant inlet connected to an expansion valve (not shown) via a refrigerant tube and a refrigerant outlet connected to a compressor (not shown) via another refrigerant tube. The heater 4 is disposed within a pressurized air passage 25 downstream of the evaporator 3. The hot water inlet and outlet of the heater 4 are connected via hot water tubes to a cooling water circuit system (not shown) for a vehicular engine. The basic arrangement described above is the same as in the first embodiment shown in FIGS. 1 through 3.

The air mixing damper 5 is disposed in a position upstream of and closely adjacent to the heater 4. A partitioning plate or projection 1c of the casing 1a, 1b is interposed between the damper 5 and the heater 4. The damper 5 is formed in a platelike configuration, which has an area capable of closing the passage to the heater 4 within the pressurized air passage 25. Designated at 51 is a damping member constituting the damper 5, and 6a and 6b are right and left damper guide halves cooperatively constituting a damper guide. The damper guide 6a, 6b has a structure which is separable into right and left halves 7. The damping member 51 is slidably fitted into a guide groove of the damper guide 6a, 6b so that the damping member is reciprocally movable in a direction perpendicular to the air flow within the air passage 25.

Figures 10A, 10B, 10C:
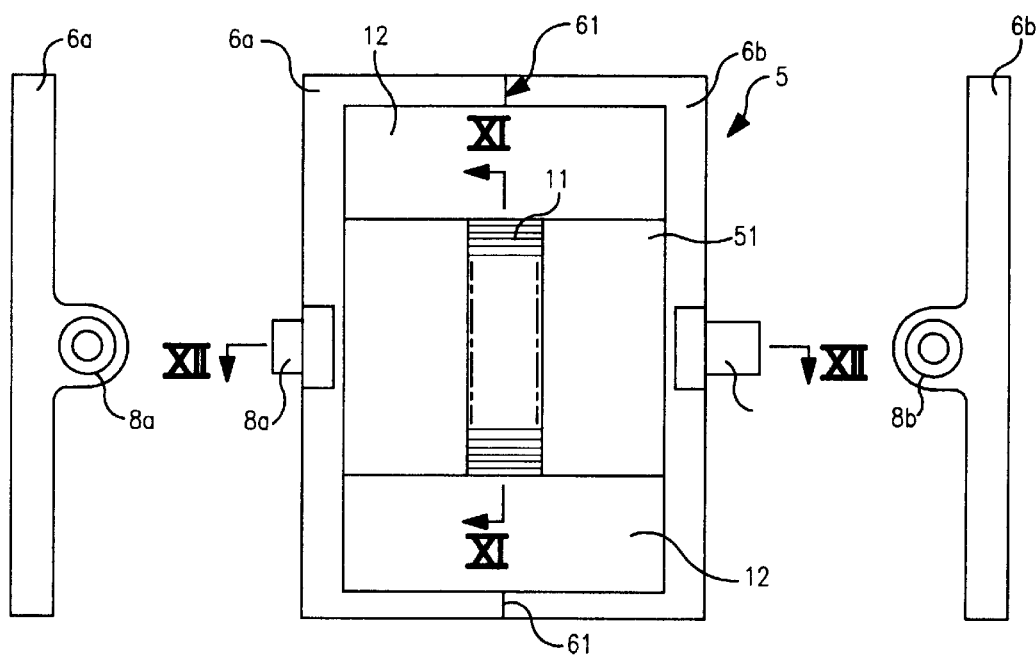
FIG. 10(A) is a front view of the air mixing damper in the second embodiment.
FIG. 10(B) is a right side view of FIG. 10(A)
FIG. 10(C) is a left side view of FIG. 10(A)
Figure 11:
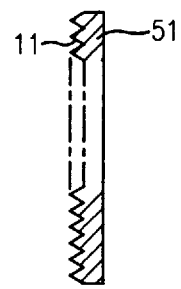
FIG. 11 is a sectional view taken along line X—X of FIG. 10(A)
Figure 12:
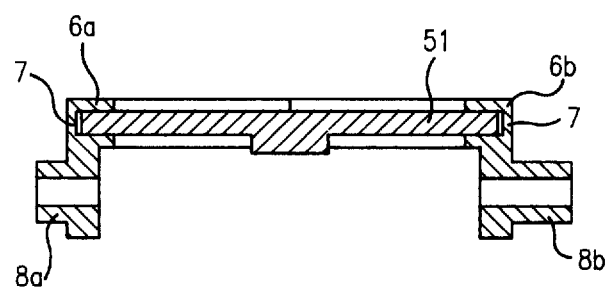
FIG. 12 is a sectional view taken along line XII—XII of FIG. 10(A)

As shown in FIGS. 10 through 12, the guide groove 7 is formed along the inner periphery of the damper guide 6a, 6b at least in the vertical direction, so as to fittedly receive the damping member 51 of damper 5. The damper guide 6a, 6b has right and left bearing portions 8a and 8b for supporting a driving shaft 9 to be described later, and forms a rectangular frame by joining the paired right and left halves of damper guide 6a and 6b at their joining surfaces 61 which extend in the same direction with those of the casing 1a, 1b.

Further, the damper guide 6a, 6b is mounted in the casing 1a, 1b by fitting the bearing portions 8a and 8b thereof for the driving shaft 9 into the supporting holes 1d and 1e of the casing 1a, 1b. The damper guide 6a, 6b defines an air-through opening 12 which has a sufficient opening area conforming to the passage 25 under this condition. The opening 12 is constituted such as to adjust the opening area toward the passage 25 between the fully opened and fully closed states, as the damping member 51 moves in the vertical direction along and within the guide groove 7 of damper guide 6a, 6b.

Along the laterally central position of one side of the damping member 51 of damper 5 is formed a rack 11 over the whole length of member 51 in the moving direction thereof. This rack 11 is engaged with a pinion 10 fixed to the driving shaft 9 supported by the bearing portions 8a and 8b provided at both ends of damper guide 6a, 6b (see FIG. 9).

Figure 8:
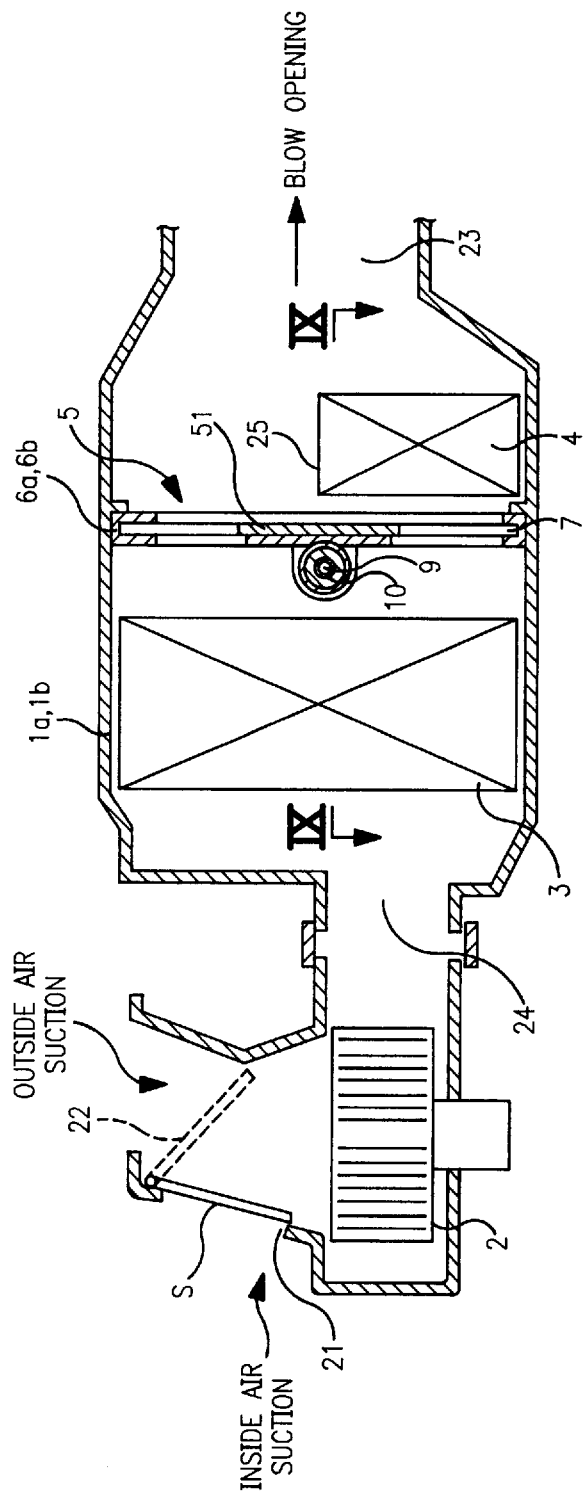
FIG. 8 is a longitudinal sectional view of an air conditioning apparatus for vehicles according to a second embodiment of the present invention.
Figure 9:
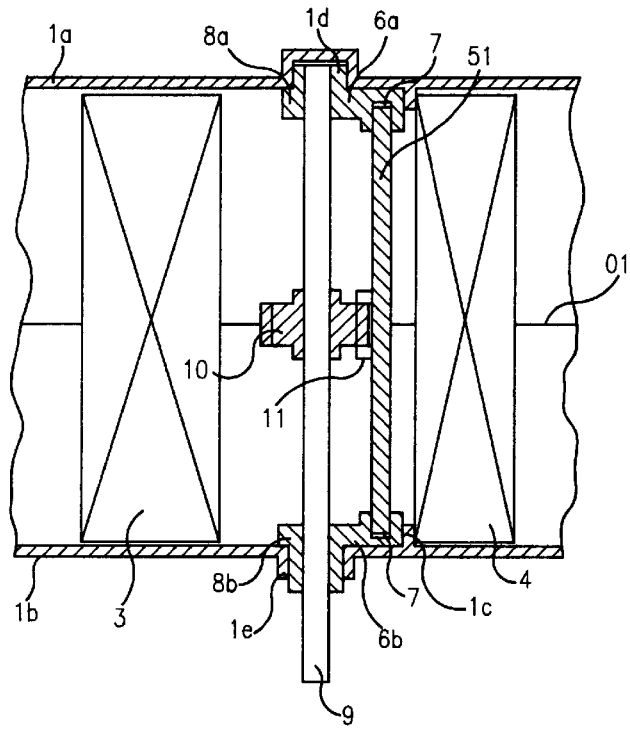
FIG. 9 is a sectional view taken along line IX—IX of FIG. 8.

As shown in FIGS. 8 and 9, the driving shaft 9 which penetrates the substantially central part of casing 1a, 1b, has both ends thereof supported by the bearing portions 8a and 8b of damper guide 6a, 6b as described above, and carries the pinion 10 fixed to its central part.

Thus, the damping member 51 of the air mixing damper 5 is constituted to be movable within and along the guide groove 7 of the damper guide 6a, 6b by the rotation of driving shaft 9 via the pinion 10 and rack 11, between the positions for fully opening and fully closing the air-through opening 12 formed by the guide 6a, 6b.

During the operation of the air conditioning apparatus for vehicles as constituted above, the fan 2 is driven to introduce the inside air circulating within the compartment or that from the outside from the suction port 21 or 22, and pressurizingly feed it into the air passage 24. The pressurized air passes through the gaps between the fins of evaporator 3, where it is cooled by heat exchange with the refrigerant flowing in the tubes of the fins, and thereafter reaches the air passage 25 upstream of heater 4.

As the driving shaft 9 is rotated by a driving shaft rotation means (not shown), the rack 11 is shifted or moved in the direction (vertical direction in FIG. 8) perpendicular to the shaft 9 via the pinion 10 fixed thereto, and the damping member 51, integral with the rack 11, is also shifted along the guide groove 7 of guide 6a, 6b in the direction perpendicular to the air flow just upstream of the heater 4.

If the damping member 51 is set in such a position as to fully close the air-through opening 12 of the damper guide 6a, 6b by the above shift, the damper 5 closes the upper half of the opening 12 leading to the passage 25 above the heater 4 as described above, so that all of the air cooled by the evaporator 3 is introduced into the heater 4 via the lower half of opening 12. This air passes through the gaps between the fins of heater 4, where it is heated by the heat exchange with the hot water flowing in the fins, and through the outlet air passage 23 downstream of heater 4, and is finally blown as hot air into the compartment via blow openings (not shown).

If the damping member 51 is set in such a position as to fully close the air-through opening 12 (lower half) in front of the front side of heater 4 by rotating the shaft 9 to thereby operate its pinion 9 and rack 11 of damping member 51 to shift the member 51 along the guide groove 7 of guide 6a, 6b, the upper half of opening 12 is fully opened. Thus, all of the air cooled by evaporator 3 flows through the upper half of opening 12, while by-passing heater 4, and through the outlet air passage 23 downstream of heater 4, and is finally blown as cooled air into the compartment via blow openings (not shown).

If the driving shaft 9 is reversely rotated from the position described just above, the damping member 51 of air mixing damper 5 is shifted upwardly via the pinion 10 and rack 11 to thereby increase the area of the lower half of opening 12 opening to heater 4 while decreasing the area of the upper half, by-passing heater 4, of opening 12. Thus, the ratio of hot air heated by the heater 4 to the cooled air by-passing heater 4 can be controlled by setting the position of the air mixing damper 5. The heated and cooled air flow together into the air passage 23 so as to be mixed therein, downstream of heater 4, to thereby produce an air having a temperature determined by the mixing ratio. The air is then blown into the compartment via the blow openings (not shown).

Figure 14:
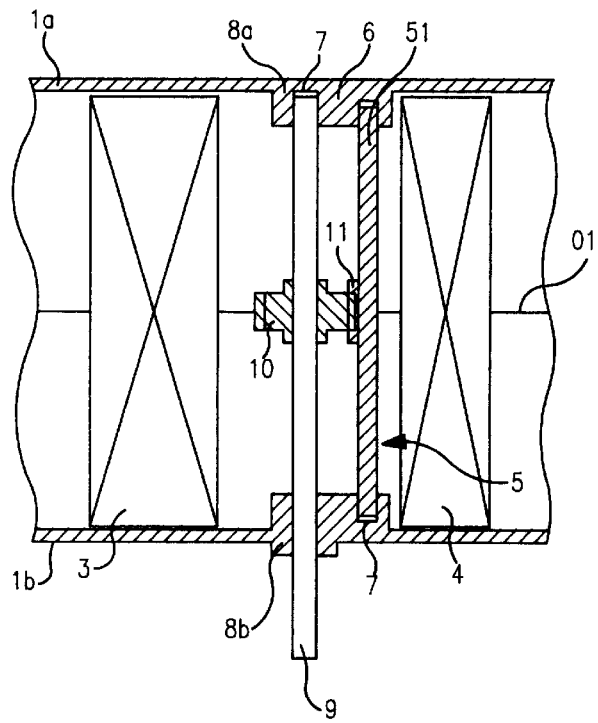
FIG. 14 is a sectional view taken along line XIV—XIV of FIG. 13.
Figure 13:
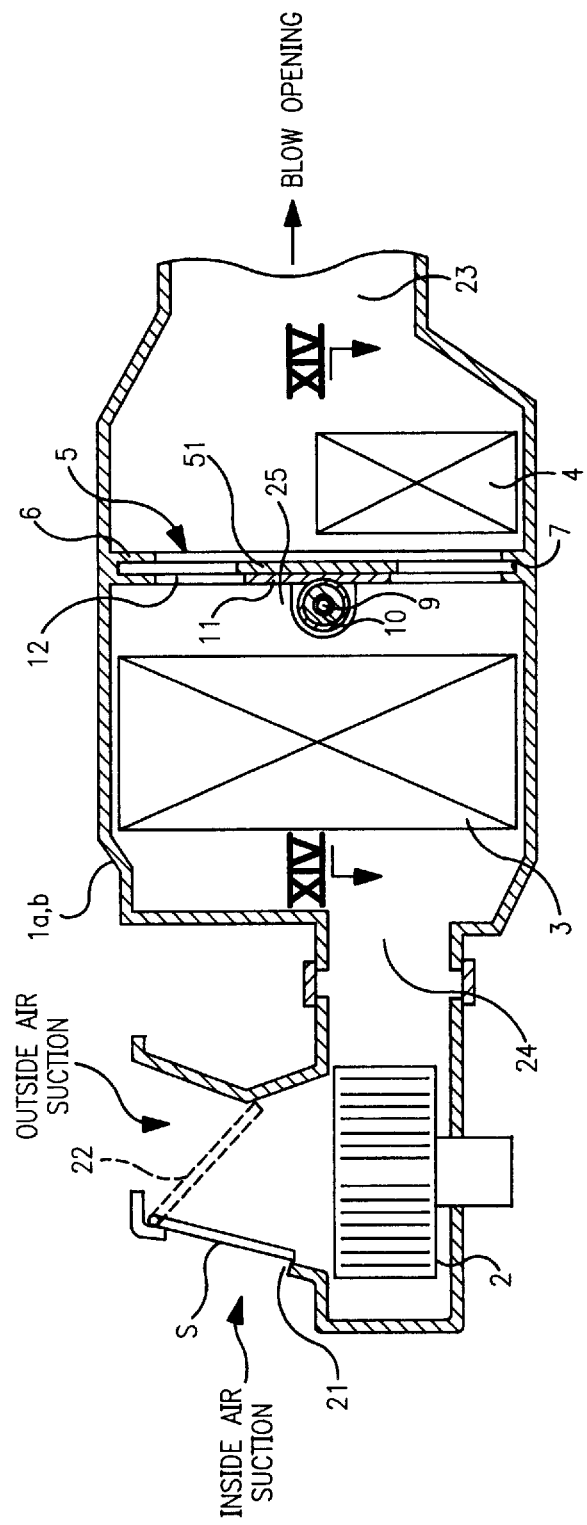
FIG. 13 is a longitudinal sectional view of an air conditioning apparatus for vehicles according to a third embodiment of the present invention.

With respect now to FIGS. 13 and 14, which show an air conditioning apparatus for vehicles according to a third embodiment of the present invention, the damper guide 6a, 6b is integrally formed with the casing 3. Thus, there will be explained hereinafter only those structures different from the second embodiment described above.

In FIGS. 13 and 14, reference numerals 1a and 1b designate right and left casing halves which are joined to each other at the joining surfaces "01" to cooperatively constitute a casing 1a, 1b. Bearing portions 8a and 8b are integrally formed with the left and right sides of casing 1a, 1b between the air outlet of evaporator 3 and the air inlet of heater 4. These bearing portions 8a and 8b rotatably receive a driving shaft 9 which penetrates the casing 1a, 1b.

The air mixing damper 5 is disposed in a position downstream of the driving shaft 9 and just upstream of the heater 4, within the pressurized air passage 25.

That is, the air mixing damper 5 is formed in a platelike configuration which is disposed just upstream of and closely adjacent to the heater 4 to thereby open and close the passage area to heater 4 within the pressurized air passage 25. The damping member 51, constituting the air mixing damper 5, is slidably fitted into a guide groove 7 formed integrally with the inner walls of the casing 1a, 1b in a manner reciprocally movable in a direction perpendicular to the air flow within the air passage 25. The damper guide 6 has an air-through opening 12 formed to have a sufficient opening area conforming to the passages 24 and 25 within the casing 1a, 1b. This air-through opening 12 is adjusted to increase and decrease the opening area of passage 25, in accordance with the vertical movement of the damping member 51 of damper 5.

As shown in FIG. 14, a rack 11 is formed over the whole length of damping member 51 of air mixing damper 5 in its moving direction, at the laterally central part of its one side. This rack 11 is engaged with a pinion 10 fixed at substantially a central part of the driving shaft 9. Thus, as the driving shaft 9 is rotatably driven, the damping member 51 of air mixing damper 5 is moved in the vertical direction in FIG. 13 along the guide groove 7 of the damper guide 6.

The opening and closing actions of the air mixing damper 5 is the same as those in the second embodiment described above. Nonetheless, in this third embodiment, compactly housed within the casing 1a, 1b are the driving mechanism for driving the air mixing damper 5, such as driving shaft 9, a motion converting mechanism comprising pinion 10 and rack 11, and bearings 8a and 8b for the driving shaft 9, while the damper guide 6 is integrally formed with the casing. Thus, the construction of this embodiment is smaller and more compact than the constructions of the first and second embodiments, while the number of constituent parts is reduced.

What is claimed is:

1. An air conditioning apparatus for a vehicle, said apparatus comprising:

a casing having an air suction opening located at an upstream end of said casing and an air blowing opening located at a downstream end of said casing;

a fan for feeding air, said fan being disposed in said casing in the vicinity of said upstream end of said casing;

an evaporator disposed in said casing and located downstream of said fan;

a heater disposed in said casing and located downstream of said evaporator;

an air mixing damper disposed in said casing adjacent to and upstream of said heater, said air mixing damper comprising a plate-like member which is movable in a direction perpendicular to the air flow direction through said casing, wherein said plate-like member is movable between a position for fully closing a front side of said heater and a position for fully closing a by-pass air flow passage which is provided for by-passing said heater;

a rack connected to said plate-like member and extending along a moving direction of said plate-like member;

a driving shaft rotatably supported in said casing; and a pinion connected to said driving shaft and engaging said rack.

2. The air conditioning apparatus as claimed in claim 1, wherein said rack is connected to an upstream side of said plate-like member which is completely disposed within said casing.

3. The air conditioning apparatus as claimed in claim 1, wherein said rack and said driving shaft, which carries said pinion, are disposed in positions upstream with respect to said air mixing damper.

4. The air conditioning apparatus as claimed in claim 1, wherein said air mixing damper further comprises:

a damper guide structure defining a guide groove for slidably guiding said plate-like damping member of said air mixing damper, and bearing portions rotatably supporting said driving shaft, wherein said damper guide structure and said bearing portions are formed integrally with said casing, which is separable into two pieces.

5. The air conditioning apparatus as claimed in claim 1, wherein said air mixing damper further comprises:

a damper guide disposed within said casing, said damper guide defining a guide groove for receiving and slidably guiding said plate-like damping member; and bearings rotatably supporting said driving shaft such that said plate-like member and driving shaft are disposed within said casing through said damper guide.

6. The air conditioning apparatus as claimed in claim 5, wherein said damper guide comprises two frame pieces which together form a rectangular frame, said frame pieces being separable in a direction perpendicular to an axis of said driving shaft.

7. The air conditioning apparatus as claimed in claim 6, wherein said frame pieces are formed of resin material, and said frame pieces and said bearings are integrally formed.

* * * * *